US006509429B1

United States Patent
Kitaichi et al.

(10) Patent No.: US 6,509,429 B1
(45) Date of Patent: Jan. 21, 2003

(54) PROCESS FOR PREPARING FLUORINE-CONTAINING POLYMER

(75) Inventors: Masanori Kitaichi, Settsu (JP); Hiroshi Aihara, Settsu (JP); Sadashige Irie, Settsu (JP); Mitsuru Kishine, Settsu (JP); Yutaka Ueta, Settsu (JP); Katsuhide Otani, Settsu (JP); Yoshiki Maruya, Settsu (JP); Hideya Saito, Settsu (JP); Mitsuo Tsukamoto, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/743,188

(22) PCT Filed: Jul. 5, 1999

(86) PCT No.: PCT/JP99/03608
§ 371 (c)(1),
(2), (4) Date: Jan. 5, 2001

(87) PCT Pub. No.: WO00/01741
PCT Pub. Date: Jan. 13, 2000

(30) Foreign Application Priority Data

Jul. 7, 1998 (JP) ............................................. 10-191337

(51) Int. Cl.⁷ .............................. C08F 14/18; C08F 2/10
(52) U.S. Cl. .......................... 526/242; 526/78; 526/87; 526/201; 524/458
(58) Field of Search ........................... 526/242, 78, 87, 526/201; 524/458

(56) References Cited

U.S. PATENT DOCUMENTS 4,141,874 A * 2/1979 Oka et al. .................... 524/458

FOREIGN PATENT DOCUMENTS

| JP | 48-34836 | 10/1973 | |
|----|----------|---------|---|
| JP | 52-76359 | 6/1977 | |
| JP | 52-84271 | 7/1977 | |
| JP | 52084271 A * | 7/1977 | ......... C08F/214/22 |
| JP | 56-57811 | 5/1981 | |
| JP | 63-23907 | 2/1988 | |
| JP | 3-247608 | 11/1991 | |

* cited by examiner

Primary Examiner—David W. Wu
Assistant Examiner—K C Egwim
(74) Attorney, Agent, or Firm—Sughrue Mion, PLLC

(57) ABSTRACT

A process for preparing a fluorine-containing polymer through emulsion polymerization method which enhances productivity while maintaining excellent physical properties of the fluorine-containing polymer and comprises (a) a first polymerization step for emulsion-polymerizing a fluorine-containing monomer or a mixture of a fluorine-containing monomer and a non-fluorine-containing monomer in an aqueous medium in the presence of a radical polymerization initiator and an emulsifying agent, (b) a dilution step for diluting the obtained aqueous emulsion of polymer particles with water to reduce the number of emulsified polymer particles per unit amount of aqueous medium in the emulsion and a concentration of emulsifying agent, and (c) a second polymerization step for emulsion-polymerizing a fluorine-containing monomer and/or a non-fluorine-containing monomer in the obtained diluted emulsified solution.

16 Claims, No Drawings

PROCESS FOR PREPARING FLUORINE-CONTAINING POLYMER

TECHNICAL FIELD

The present invention relates to a novel process for preparing a fluorine-containing polymer by an emulsion polymerization method

BACKGROUND ART

Fluorine-containing elastomers such as elastomeric vinylidene fluoride/hexafluoropropylene (VdF/HFP) copolymer and elastomeric tetrafluoroethylene (TFE)/perfluoro(vinyl ether) copolymer exhibit excellent chemical resistance, solvent resistance and heat resistance and therefore have been widely used for O-ring, gasket, hose, stem seal, shaft seal, diaphragm, etc. in the fields of automobile, semiconductor industry and chemical industry which are used under tough environment.

Example s of the fluorine-containing rubber used in those applications are fluorine-containing elastomers having iodine which have highly active iodine atom at a molecular end thereof. The fluorine-containing elastomer having iodine makes it possible to give a good crosslinking efficiency by iodine atom at a molecular end thereof and is excellent in vulcanizability. Therefore a chemical substance having metal component need not be added to the elastomer and the elastomer is subjected to peroxide vulcanization to give a molded article. As a result, a vulcanized article having more excellent tensile strength, elongation at break and compression set as compared with other vulcanization system can be obtained.

The fluorine-containing elastomer having iodine is prepared by emulsion polymerization such as iodine transfer polymerization described in JP-B-63-41928. However in order to attain a high iodine transfer rate, it is necessary to reduce an amount of polymerization initiator (Masayoshi Tatemoto, Control of Polymer Structure in Radical Polymerization, p 19, 86/6, Micro Symposium of The Society of Polymer Science, Japan (1986)), and accordingly productivity cannot be increased. In a polymerization system where there is no restriction on an amount of polymerization initiator, a polymerization rate can be easily raised by increasing an amount of polymerization initiator. However in the iodine transfer polymerization system, since a concentration of polymer end derived from the initiator has a great effect on physical properties of final products, it is impossible to expect that an amount of initiator is increased.

In order to enhance productivity, various proposals have been made. For example, in JP-A-3-33108 and JP-A-3-221510, a method for enhancing productivity by conducting emulsion polymerization continuously is proposed, but good tensile strength and compression set which are characteristics of the fluorine-containing elastomer having iodine cannot be obtained.

Also in JP-A-5-222130, a method for polymerizing at high pressure of not less than 1.7 MPa (gauge pressure, hereinafter the same) is proposed, but a high pressure equipment is required. Further in JP-A-63-8406, micro emulsion polymerization method is proposed, but since use of fluorine-containing oil, etc. is initially necessary for forming micro emulsion and the fluorine-containing oil, etc. remain in a product and become contamination sources, it is necessary to remove the oil, etc. by washing.

In order to merely stabilize a polymerization system and increase a polymerization rate, an amount of an emulsifying agent may be increased, but since the emulsifying agent itself causes a vulcanization failure, it is also necessary to remove the emulsifying agent by washing.

As mentioned above, there was no method for preparing a fluorine-containing elastomer having iodine which can make productivity and maintenance of properties thereof compatible with each other.

With respect to the fluorine-containing rubbers, in addition to the above-mentioned fluorine-containing elastomer having iodine, there are some elastomers which are required to have a reduced amount of ionic functional groups at its molecular end which are derived from a water soluble radical polymerization initiator, from the viewpoint of characteristics of the elastomer at vulcanization and physical properties of vulcanized molded article. Examples thereof are fluorine-containing elastomers which are prepared in combination of aromatic polyhydroxy compounds with quaternary phosphonium salt, quaternary ammonium salt, and the like and are used for so-called polyol vulcanization. It is proposed that those fluorine-containing elastomers are prepared by two-staged emulsion polymerization method (WO96/17876).

In the two-staged polymerization method, at first in the first stage, several percent of polymer to a total yield is polymerized by using a water soluble radical polymerization initiator to give seeds of emulsified particles, and then in the second stage, the seed particles are grown by using an organic peroxide and most of remaining polymer of not less than 90% are synthesized. However in that polymerization method, there are limits in amounts of emulsifying agent and water soluble radical polymerization initiator which are used in the first stage and have an adverse effect on the vulcanization rate, and the number of seed particles cannot be increased. Therefore a final size of emulsified particles exceeds 500 nm and becomes unstable, sticking of polymer inside a polymerization tank is much, washing thereof is complicated, much loss of product arises and productivity is poor.

The inventors of the present invention have made intensive studies to enhance productivity of the fluorine-containing elastomer with maintaining characteristics of the elastomer without modifying existing emulsion polymerization facilities and have found that the fluorine-containing elastomer having uniform particle size can be obtained efficiently with maintaining inherent characteristics by separating emulsion polymerization into two stages, in which in the first stage polymerization, many polymer particles are synthesized by using relatively much amount of emulsifying agent and then the obtained emulsion is diluted to reduce concentrations of polymer particles and emulsifying agent, and in the second stage, polymerization is carried out by using the diluted emulsion.

Further it was found that when the two-staged polymerization including the diluting step is applied to preparation of other fluorine-containing polymer, excellent effects are exhibited, and thus the present invention was completed. For example, when a tetrafluoroethylene/hexafluoropropylene copolymer is prepared by emulsion polymerization, it was found that by employing the two-staged polymerization method of the present invention, a polymerization rate can be increased by four times or more even at the same concentration of emulsifying agent as compared with usual one-staged polymerization.

By employing the emulsion polymerization method of the present invention, a particle size of final emulsified particles after the polymerization can be easily reduced to not more than 500 nm, particularly not more than 400 nm without producing an adverse effect on vulcanizability of the obtained fluorine-containing elastomer and properties of the obtained vulcanized article, stability of an emulsion is greatly enhanced and sticking of polymer inside a polymerization tank can be reduced.

DISCLOSURE OF INVENTION

The present invention relates to the process for preparing a fluorine-containing polymer comprising:

(a) a first polymerization step for emulsion-polymerizing at least one fluorine-containing monomer or a mixture of at least one fluorine-containing monomer and at least one non-fluorine-containing monomer in an aqueous medium in the presence of a radical polymerization initiator and an emulsifying agent, (b) a dilution step for diluting the obtained aqueous emulsion of polymer particles with water to reduce the number of emulsified polymer particles per unit amount of aqueous medium in the emulsion and a concentration of emulsifying agent, and (c) a second polymerization step for emulsion-polymerizing at least one fluorine-containing monomer and/or at least one non-fluorine-containing monomer in the obtained diluted emulsion.

According to the preparation process of the present invention, a particle size of polymer obtained with a small amount of emulsifying agent can be reduced, and as a result, a stable emulsion can be obtained. Also the obtained polymer particles have a uniform particle size, and a polymer content can be made high.

Also since the polymerization rate in the second polymerization step can be increased by two times or more as compared with usual iodine transfer polymerization method, a total polymerization time can be shortened.

Further a final yield of the polymer can be increased by three times.

In the second polymerization step, emulsion polymerization can be carried out continuously while continuously introducing the diluted emulsion, fluorine-containing monomer and/or non-fluorine-containing monomer.

The fluorine-containing polymers obtained by the above-mentioned preparation process are a fluorine-containing elastomer and fluorine-containing resin. It is preferable that the fluorine-containing elastomer comprises vinylidene fluoride and hexafluoropropylene and the fluorine-containing resin comprises tetrafluoroethylene and hexafluoropropylene.

BEST MODE FOR CARRYING OUT THE INVENTION

The preparation process of the present invention basically comprises three steps of the first polymerization step, dilution step and second polymerization step.

The first polymerization step is a step for emulsion-polymerizing a fluorine-containing monomer or a mixture of a fluorine-containing monomer and a non-fluorine-containing monomer in an aqueous medium in the presence of a radical polymerization initiator and emulsifying agent.

An object of this step is to produce a lot of uniform fine particles of fluorine-containing polymer. Therefore relatively much amount of emulsifying agent is used. A concentration of the emulsifying agent based on water is from 0.5 to 10% by weight (hereinafter referred to as "%"), especially 1 to 3% though it varies depending on polymerization conditions such as kind of the emulsifying agent, concentration of monomer and polymerization rate.

In the first polymerization step, the number of produced fluorine-containing polymer particles is adjusted to not less than $1\times10^{14}$ (number of particles per 1 cc of aqueous medium), preferably $1\times10^{14}$ to $1\times10^{17}$, more preferably $1\times10^{14}$ to $1\times10^{16}$. The number of polymer particles can be adjusted in the first polymerization step by an amount of the emulsifying agent, control of stirring rate, concentration of monomer, etc. An average particle size of the polymer particles prepared in the first polymerization step is not more than 200 nm and not less than 10 nm, preferably 20 to 100 nm. When more than 200 nm, a proportion of polymer (seed polymer) obtained in the first polymerization step is increased and an effect of the present invention is lowered. When less than 10 nm, the particles become unstable in the second polymerization step and the polymerization cannot be completed with the set number of particles.

Examples of the fluorine-containing monomer polymerized in the first polymerization step are, for instance, tetrafluoroethylene (TFE), hexafluoropropylene (HFP), perfluoro(alkyl vinyl ether) (PAVE), vinylidene fluoride (VdF), chlorotrifluoroethylene (CTFE), trifluoroethylene, vinyl fluoride, trifluoropropylene, pentafluoropropylene, tetrafluoropropylene, hexafluoroisobuterie, $CF_2=CF(CF_2)_pX^3$, in which p is an integer of 1 to 10, $X^3$ is F or Cl, perfluoro-2-butene, $CH_2=C(CF_3)_2$, and a monomer mixture of two or more thereof. Examples of the non-fluorine-containing monomer which can be used together (copolymerized) with those fluorine-containing monomers are, for instance, ethylene, propylene, vinyl chloride, vinyl esters of carboxylic acids, acrylates, alkyl vinyl ethers such as methyl vinyl ether, and the like.

The intended fluorine-containing polymer can be prepared by a single use or combination use of those fluorine-containing monomers and/or non-fluorine-containing monomers. Examples of the fluorine-containing polymers are fluorine-containing polymers which can be prepared by emulsion polymerization, for instance, homopolymers such as polytetrafluoroethylene (PTFE), polyvinylidene fluoride (PVdF) and polychlorotrifluoroethylene (PCTFE); fluorine-containing resins such as TFE/PAVE copolymer (PFA), TFE/HFP copolymer (FEP), VdF/TFE copolymer, TFE/ethylene copolymer (ETFE) and chlorotrifluoroethylene (CTFE)/ethylene copolymer (ECTFE); and fluorine-containing elastomers such as TFE/perfluoro(alkyl vinyl ether) elastomer, VdF/HFP elastomer, VdF/CTFE elastomer, VdF/HFP/TFE elastomer, VdF/CTFE/TFE elastomer, TFE/propylene elastomer, TFE/propylene/VdF elastomer and ethylene/HFP elastomer. Among them, as mentioned above, the preparation process of the present invention is suitable for preparation of fluorine-containing elastomers which are inferior in productivity, such as TFE/perfluoro(alkyl vinyl ether) elastomer, VdF/HFP elastomer, VdF/HFP/TFE elastomer, VdF/CTFE elastomer, VdF/CTFE/TFE elastomer, ethylene/HFP elastomer, ethylene/HFP/VdF elastomer, ethylene/HFP/TFE: elastomer, TFE/propylene elastomer and TFE/propylene/VdF elastomer. The preparation process of the present invention is suitable particularly for preparation of a fluorine-containing elastomer having iodine by iodine transfer polymerization and preparation of a fluorine-containing elastomer having a highly stabilized molecular end by using an oil soluble radical polymerization initiator.

The emulsion polymerization is carried out in an aqueous medium in the presence of a radical polymerization initiator and emulsifying agent. The aqueous medium is usually water, and a stabilizing agent such as alcohol may be used together.

Radical polymerization initiators which are used for emulsion polymerization of the respective fluorine-containing polymers can be used as they are. Preferred are, for example, persulfates such as ammonium persulfate and potassium persulfate, peroxycarbonate and peroxyester. As case demands, organic peroxides can be used.

With respect to the radical polymerization initiator, particularly in emulsion polymerization of copolymerization system comprising VdF and HFP (for example, VdF/HFP, VdF/HFP/TFE, etc.), from the viewpoint; of excellent vulcanizability of the obtained elastomer and good characteristics of vulcanized article, it is preferable that in the first polymerization step (a), a water soluble radical polymerization initiator is used and in the second polymerization step (c) mentioned hereinafter, an oil soluble radical polymerization initiator is used. As occasion demands, use of the oil soluble radical polymerization initiator may be begun in the midst of the first polymerization step (a).

As the water soluble radical polymerization initiator, known water soluble peroxides are used. Typical examples thereof are, for instance, ammonium salts, sodium salt or potassium salt of persulfuric acid, perboric acid, perchloric acid, perphosphoric acid, percarbonate, and the like; disuccinyl peroxide, t-butyl permaleate, t-butyl hydroperoxide, and the like.

As the oil soluble radical polymerization initiator, known oil soluble peroxides are used. Typical examples thereof are, for instance, dialkyl peroxycarbonates such as di-isopropyl peroxydicarbonate and di-sec-butyl per6xydicarbonate; peroxyesters such as t-butyl peroxyisobutyrate and t-butyl peroxypivalate; dialkyl peroxides such as di-t-butyl peroxide; di[perfluoro(or fluorochloro)acyl] peroxides such as di(ω-hydro-dodecafluoroheptanoyl) peroxide, di(ω-hydro-tetradecafluoroheptanoyl) peroxide, di(ω-hydro-hexadecafluorononanoyl) peroxide, di(perfluorobutyryl) peroxide, di(perfluorovalery) peroxide, di(perfluorohexanoyl) peroxide, di(perfluoroheptanoyl) peroxide, di(perfluorooctanoyl) peroxide, di(perfluorononanoyl) peroxide, di(ω-chloro-hexafluorobutyryl) peroxide, di(ω-chloro-decafluorohexanoyl) peroxide, di(ω-chloro-tetradecafluorooctanoyl) peroxide, ω-hydro-dodecafluoroheptanoyl-ω-hydrohexadecafluorononanoyl-peroxide, ω-chloro-hexafluorobutyryl-ωchloro-decafluorohexanoyl-peroxide, ω-hydrododecafluoroheptanoyl-perfluorobutyryl-peroxide, di(dichloropentafluorobutanoyl) peroxide, di(trichlorooctafluorohexanoyl) peroxide, di(tetrachloroundecafluorooctanoyl) peroxide, di(pentachlorotetradecafluorodecanoyl) peroxide and di(undecachlorodotriacontalluorodocosanoyl) peroxide; and the like.

An amount of the polymerization initiator is not limited particularly, but when a polymer chain end of the obtained fluorine-containing polymer is controlled, it is important to reduce an amount of the water soluble radical polymerization initiator as much as possible. For example, the amount of the initiator may be adjusted so that its concentration based on the aqueous medium is from 0.001 to 0.1%, preferably 0.005 to 0.05%.

For the polymerization process of the present invention, a variety of emulsifying agents can be used. From the viewpoint of controlling a chain transfer reaction to molecules of the emulsifying agent which arises during the polymerization, salts of sulfonic acid and carboxylic acid having a fluorocarbon chain or fluoropolyether chain are preferable.

Examples of the emulsifying agent are as follows.

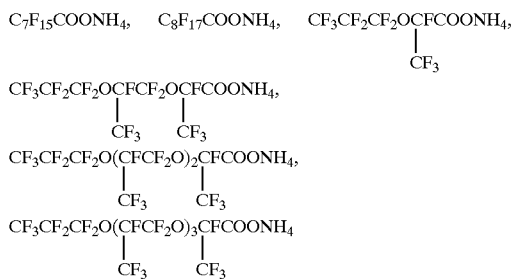

A total amount of the emulsifying agent used until completion of the second polymerization step is preferably from about 0.05% to about 1.0%, particularly preferably 0.1 to 0.5% based on added water.

Emulsion polymerization of the first stage is not limited particularly, and generally is carried out by previously introducing an aqueous medium containing an emulsifying agent and a fluorine-containing monomer or a monomer mixture and then introducing a radical polymerization initiator into a reactor. The monomer being in the form of liquid at normal temperature may be previously emulsified in the aqueous medium before introduced. The monomer being in the form of gas at normal temperature is introduced under pressure. The polymerization is carried out with stirring.

Emulsion polymerization conditions other than the amount of emulsifying agent and radical polymerization initiator may be usual conditions known in each polymerization method. For example, in preparing fluorine-containing resins such as PTFE, FEP and PFA, a polymerization temperature of 5 to 120° C., a polymerization pressure of 0.2 to 8 MPa, etc. are employed.

Polymerization conditions suitably employed in emulsion polymerization, particularly iodine transfer polymerization of a fluorine-containing elastomer are as follows.

Emulsion polymerization is carried out under pressure with stirring the above-mentioned fluorine-containing monomer in the presence of a radical polymerization initiator and emulsifying agent in an aqueous medium substantially in the absence of oxygen in the presence of an iodine compound or bromine compound, preferably diiodine compound.

Examples of the usable iodine compound or bromine compound are compounds represented by the formula (I):

$$R(I)x(Br)y \hspace{2em} (I)$$

wherein R is a saturated or unsaturated divalent fluoro hydrocarbon group or divalent chlorofluoro hydrocarbon group having 1 to 16 carbon atoms or a saturated or unsaturated divalent hydrocarbon group having 1 to 3 carbon atoms, x and y are 0, 1 or 2, x+y=2. Examples thereof are, for instance, substitution products having a substituent at various positions such as monoiodomonobromo-substituted product, diiodomonobromo-substituted product, monoiododibromo-substituted product and (2-iodoethyl)- and (2-bromoethyl)-substituted products of 1,3-diiodoperfluoropropane, 1,4-diiodoperfluorobutane, 1,3-diiodo-2-chloroperfluoropropane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFClBr$, $CFBrClCFClBr$, BrCF$_2$CF$_2$CF$_2$Br, BrCF$_2$CFBrOCF$_3$, 1-bromo-2-iodoperfluoroethane, 1-bromo-3-iodoperfluoropropane, 1-bromo-4-iodoperfluorobutane, 2-bromo-3-iodoperfluorobutane, 3-bromo-4-iodoperfluorobutene-1,2-bromo-4-iodoperfluorobutene-1 and benzene. Those compounds may be used solely and can be used in combination with each other. Among them, from the viewpoint of polymerization reactivity, crosslinking reactivity and availability, 1,4-diiodoperfluorobutane is preferable. An amount of the diiodine compound is from 0.01 to 1% by weight based on a total weight of the fluorine-containing monomer. The emulsion polymerization in the presence of the iodine compound is advantageous since a polymerization rate is increased.

Also it is possible to copolymerize a monomer containing iodine with the fluorine-containing elastomer. As the monomer containing iodine, a perfluoro(vinyl ether) compound is suitable from the viewpoint of copolymerizability thereof. For example, perfluoro(6,6-dihydro-6-iodo-3-oxa-1-hexene), perfluoro(5-iodo-3-oxa-1-pentene), and the like disclosed in JP-B-5-63482 and JP-A-62-12734 are suitable.

A polymerization temperature can be changed in the range of from about 10° C. to about 100° C. depending on properties of an initiator used and monomer. However when less than 40° C., in case of a single use of peroxide, a polymerization rate is low, and a redox initiator with a sulfite is suitable.

The radical polymerization initiator may be the same as one which has been used in iodine transfer polymerization of fluorine-containing elastomer. As those initiators, there are organic and inorganic peroxides and azo compounds as mentioned above. Typical examples of the initiator are persulfates, peroxycarbonates, peroxyesters, and the like. A preferred initiator is ammonium persulfate (APS). APS may be used solely, and can be used in combination with a reducing agent such as sulfites.

For the emulsion polymerization, a variety of emulsifying agents as mentioned above can be used. From the viewpoint of inhibiting a chain transfer reaction to molecules of the emulsifying agent which arises during the polymerization, salts of carboxylic acid having a fluorocarbon chain or fluoropolyether chain are desirable. An amount of the emulsifying agent used in the first polymerization step (a) is desirably from about 0.5% to about 10%, particularly desirably 0.5 to 8% based on added water.

A polymerization pressure can be changed in a wide range, generally in a range of 0.5 to 8 MPa. The higher the polymerization pressure is, the more the polymerization rate is increased. Therefore from the viewpoint of enhancement of productivity, it is desirable that the polymerization pressure is not less than 0.8 MPa.

In the emulsion obtained in the first polymerization step, $1 \times 10^{14}$ or more polymer particles (per 1 cc of water) are emulsified and dispersed. This emulsion is supplied to the following dilution step.

In the dilution step, the emulsified solution obtained in the first polymerization step which has polymer particles in large number and contains much amount of emulsifying agent is diluted with water to finally obtain the desired number of particles and desired amount of emulsifying agent. It is preferable that the dilution is carried out so that the number of polymer particles (per 1 cc of water) becomes $3 \times 10^{13}$ to $1 \times 10^{15}$, preferably: $3 \times 10^{13}$ to $3 \times 10^{14}$ and the concentration of emulsifying agent becomes 0.3 to 30 mg/g polymer, preferably 3 to 30 mg/g polymer. Therefore the dilution is preferably carried out by three times or more, usually in a range of 3 to 100 times.

It is preferable that an amount of polymer to be used in the second polymerization step after produced in the first polymerization step and diluted in the dilution step is from 0.5 to 10%, particularly 0.5 to 3% based on a final amount of the polymer (after completion of the second polymerization step) from the viewpoint of vulcanizability of the obtained fluorine-containing polymer.

The second polymerization step is carried out by using the diluted emulsion. Emulsion polymerization in the second polymerization step may be carried out in the same manner as in the first polymerization step except a concentration of the emulsifying agent. A radical polymerization initiator may be changed to an oil soluble initiator.

The fluorine-containing monomer and/or non-fluorine-containing monomer to be used for the emulsion polymerization in the second polymerization step may be the same as or different from those for the first polymerization step. For example, the first polymerization step may be carried out by using a non-fluorine-containing monomer solely and then the second polymerization step may be carried out by using a fluorine-containing monomer.

An amount of the iodine compound or bromine compound is from 0.001 to 5%, preferably 0.01 to 1% based on the total weight of the polymer.

The addition of the compound (I) is advantageous from the viewpoint of good vulcanizability of the elastomer in case where the fluorine-containing monomer to be polymerized is a system comprising TFE and perfluoro(vinyl ether) (for example, TFE/perfluoro(alkyl vinyl ether), TFE/VdF/HFP, VdF/TFE/perfluoro(alkyl vinyl ether), and the like).

In the second polymerization step, the number of polymer particles does not change substantially, and only a particle size is increased. Therefore in order to stabilize an emulsion, an emulsifying agent may be added to the particle size increasing in the second polymerization step. A preferable adding amount thereof is from 0.1 to 5 mg, more preferably 0.6 to 1.8 mg per 1 g of polymer.

It is preferable that the second polymerization step is stopped at the time when an average particle size of polymer particles becomes not more than 500 nm, particularly 250 to 400 nm, from the viewpoint of prevention of sticking of polymer on inner walls of a polymerization tank and productivity. However in case of a continuous polymerization method, from a point of enabling a long term operation, it is preferable that the second polymerization step is carried out under condition that an average particle size is 50 to 200 nm.

Since the number of polymer particles in the emulsion is properly controlled in the second polymerization step and as a result, a particle size is also controlled properly, an amount of polymer sticking on inner walls of a polymerization reactor can be reduced and also a high concentration of polymer in an aqueous dispersion after the polymerization can be obtained.

For the emulsion polymerization of the present invention, it is possible to employ a so-called batch type polymerization method, a semi-batch type polymerization method of continuously adding a monomer mixture as shown in examples described later, a continuous polymerization method of diluting an aqueous emulsion obtained in the first polymerization step with water to give a diluted emulsion having the specified number of polymer particles and a specified concentration of emulsifying agent and then continuously supplying the diluted emulsion to the second polymerization step, and a continuous polymerization method of carrying out the first polymerization step through the second polymerization step completely continuously.

In case of the continuous polymerization method, in the first polymerization step and dilution step, various types of reactors can be used, such as a tube type reactor which enables a plug flow to be obtained, Taylor Vortex type reactor and a tank reactor of completely mixing type. Further a combination use thereof may be adopted. Among them, the tube type reactor enabling the plug flow to be obtained is preferred for the reason that the number of generated particles is increased. In the second polymerization step, various types of reactors can be adopted similarly. However from the viewpoint of obtaining a uniform polymer having a narrow distribution of components, a completely mixing type tank reactor is preferable.

Then the preparation process of the present invention is explained by means of examples, but the present invention is not limited to them.

EXAMPLE 1

First Stage Polymerization Step

A 3-liter stainless steel autoclave was charged with 1.0 liter of pure water and 200 g of ammonium perfluorooctanoate (10% aqueous solution), and the inside of a system was replaced with nitrogen gas sufficiently. After heating to 80° C. with stirring at 200 rpm, a monomer mixture comprising vinylidene fluoride (VdF)/tetrafluoroethylene (TFE)/perfluoro(methyl vinyl ether) (PMVE) (VdF/TFE/PMVE= 69/5/26 in % by mole) was introduced under pressure so that an inside pressure of the autoclave became 1.47 MPa. Then 4 ml of 0.1% aqueous solution of ammonium persulfate (APS) was introduced with pressurized nitrogen as to initiate a reaction.

At the time when the inside pressure lowered to 1.37 MPa with advance of the polymerization, a monomer mixture of VdF/TFE/PMVE (75/7/18% by mole) was introduced under pressure to restore the inside pressure of 1.47 MPa. After that, with advance of the reaction, the monomer mixture was introduced in the same way under pressure, and thus an increase and decrease in pressure were repeated between 1.37 MPa and 1.47 MPa.

When the total amount of the monomers reached 335 g, the autoclave was cooled, the monomers were exhausted and the reaction was stopped. The polymerization time was 45 minutes.

A weight of the obtained emulsion was 1,328 g, a solid content of polymer was 26.1% by weight, and an average particle size of polymer particles (measured with Microtrac (trade mark) 9340UPA available from HONEYWELL CO., LTD.) was 56 nm.

The number of polymer particles (per 1 cc of water) calculated from the obtained average particle size by using the following equation was $2.1 \times 10^5$.

$$\begin{array}{l} \text{Number of polymer} \\ \text{particles} \end{array} = \frac{\text{Solid content of polymer}}{100 - (\text{Solid content of polymer})} \Big/ \left\{ \frac{4}{3} \times 3.14 \times \left( \frac{\text{Average particle size (nm)}}{2} \times 10^{-9} \right)^3 \times \text{Specific weight} \times 10^6 \right\}$$

In the equation, the number of polymer particles is per 1 cc of water, and in examples, 1.8 is substituted for the specific weight.

Dilution Step

A 3-liter stainless steel autoclave was charged with 34 g of emulsion obtained in the first polymerization step, and then 966 g of pure water was added to dilute the emulsion (about 29 times) so that the number of polymer particles became $5 \times 10^{13}$ (per 1 cc of water).

Second Stage Polymerization Step

After adding 15 g of ammonium perfluorooctanoate (10% aqueous solution) and 1.2 g of 1,4-diiodoperfluorobutane to the diluted emulsion, inside of a system was sufficiently replaced with nitrogen gas.

After heating up to 80° C. with stirring at 200 rpm, a monomer mixture comprising VdF/TFE/PMVE (72/4/24% by mole) was introduced under pressure so that the inside pressure became 1.47 MPa. Then 4 ml of 0.1% aqueous solution of ammonium persulfate (APS) was introduced with compressed nitrogen gas to initiate a reaction.

At the time when the inside pressure lowered to 1.37 MPa with advance of the polymerization, a monomer mixture of VdF/TFE/PMVE (75/7/18% by mole) was introduced under pressure to restore the inside pressure of 1.47 MPa. After that, with advance of the reaction, the monomer mixture was introduced in the same way under pressure, and thus an increase and decrease in pressure were repeated between 1.37 MPa and 1.47 MPa. Also every three hours after starting of the polymerization, 1 ml of APS (0.1% aqueous solution) was introduced with compressed nitrogen gas.

When the total amount of the monomers reached 372 g, the autoclave was cooled, the monomers were exhausted and the reaction was stopped. The polymerization time was six hours and 45 minutes.

A weight of the obtained emulsion was 1,493 g, a solid content of polymer was 24.9% by weight, and an average particle size of polymer particles was 264 nm. The number of polymer particles (per 1 cc of water) calculated by the above-mentioned equation was $5 \times 10^{13}$, and thus there is no change in the number of polymer particles as compared with that when initiating the second polymerization step.

Also a polymer sticking on inner walls of the autoclave was collected and dried at 120° C. for 12 hours. A weight thereof was 0.37 g.

A 25% aqueous solution of $KAl(SO_4)_2$ was added to the emulsion for coagulation thereof, followed by washing with water and drying at 120° C. for 12 hours to collect an intended fluorine-containing polymer. As a result of NMR analysis, the fluorine-containing polymer was an elastomer comprising VdF/TFE/PMVE of 75/7/18 (% by mole).

COMPARATIVE EXAMPLE 1

A 3-liter stainless steel autoclave was charged with 1.0 liter of pure water, 20 g of ammonium perfluorooctanoate (10% aqueous solution) and 1.21 g of 1,4-diiodoperfluorobutane, inside of a system was sufficiently replaced with nitrogen gas. After heating up to 80° C. with stirring at 200 rpm, a monomer mixture comprising VdF/TFE/PMVE (72/4/24% by mole) was introduced under pressure so that the inside pressure became 1.47 MPa. Then 4 ml of 0.1% aqueous solution of ammonium persulfate (APS) was introduced with compressed nitrogen gas to initiate a reaction.

At the time when the inside pressure lowered to 1.37 MPa with advance of the polymerization, a monomer mixture of VdF/TFE/PMVE (75/7/18% by mole) was introduced under pressure to restore the inside pressure of 1.47 MPa. After that, with advance of the reaction, the monomer mixture was introduced in the same way under pressure, and thus an increase and decrease in pressure were repeated between 1.37 MPa and 1.47 MPa. Also every three hours after starting of the polymerization, 1 ml of APS (0.1% aqueous solution) was introduced with compressed nitrogen gas.

When the total amount of the monomers reached 372 g, the autoclave was cooled, the monomers were exhausted and the reaction was stopped. The polymerization time was 15 hours and 36 minutes.

A weight of the obtained emulsion was 1,366 g, a solid content of polymer was 24.9% by weight, and an average particle size of polymer particles was 310 nm. The number of polymer particles (per 1 cc of water) calculated by the above-mentioned equation was $1.25 \times 10^{13}$.

Also a polymer sticking on inner walls of the autoclave was collected and dried at 120° C. for 12 hours. A weight thereof was 1.45 g.

A 25% aqueous solution of $KAl(SO_4)_2$ was added to the emulsion for coagulation thereof, followed by washing with water and drying at 120° C. for 12 hours to collect an intended fluorine-containing polymer. The fluorine-containing polymer was an elastomer comprising VdF/TFE/PMVE of 75/7/18 (% by mole).

EXAMPLE 2

First Stage Polymerization Step

A 30-liter stainless steel autoclave was charged with 20 liter of pure water and 400 g of ammonium perfluorooctanoate (10% aqueous solution), and the inside of a system was replaced with nitrogen gas sufficiently. After heating to 80° C. with stirring at 200 rpm, a monomer mixture comprising vinylidene fluoride (VdF)/hexafluoropropylene (HFP) (VdF/HFP=58/42% by mole) was introduced under pressure so that inside pressure of the autoclave became 1.47 MPa. Then 500 g of 1.6% aqueous solution of ammonium persulfate (APS) was introduced with pressurized nitrogen gas to initiate a reaction.

At the time when the inside pressure lowered to 1.37 MPa with advance of the polymerization, a monomer mixture of VdF/HFP (78/22% by mole) was introduced under pressure to restore the inside pressure of 1.47 MPa. After that, with advance of the reaction, the monomer mixture was introduced in the same way under pressure, and thus an increase and decrease in pressure were repeated between 1.37 MPa and 1.47 MPa.

When the total amount of the monomers reached 3.4 kg, the autoclave was cooled, the monomers were exhausted and the reaction was stopped. The polymerization time was 106 minutes.

A weight of the obtained emulsion was 24.1 kg, a solid content of polymer was 14.5% by weight, and an average particle size of polymer particles was 48 nm. The number of polymer particles (per 1 cc of water) calculated by the above-mentioned equation was $1.62 \times 10^{15}$.

Dilution Step

A 30-liter stainless steel autoclave was charged with 2.1 kg of emulsion obtained in the first polymerization step, and then 24 kg of pure water was added to dilute the emulsion (about 11 times) so that the number of polymer particles became $5 \times 10^{13}$ (per 1 cc of water).

Second Stage Polymerization Step

After the inside of the autoclave containing the diluted emulsion was sufficiently replaced with nitrogen gas and heated up to 80° C. with stirring at 200 rpm, a monomer mixture comprising VdF/HFP (55.7/44.3% by mole) was introduced under pressure so that the inside pressure became 1.47 MPa. Then 45.2 g of diisopropyl peroxydicarbonate (IPP) was introduced with compressed nitrogen gas to initiate a reaction.

At the time when the inside pressure lowered to 1.37 MPa with advance of the polymerization, a monomer mixture of VdF/HFP (78/22% by mole) was introduced under pressure to restore the inside pressure of 1.47 MPa. After that, with advance of the reaction, the monomer mixture was introduced in the same way under pressure, and thus an increase and decrease in pressure were repeated between 1.37 MPa and 1.47 MPa.

When the total amount of the monomers reached 10.0 kg, the autoclave was cooled, the monomers were exhausted and the reaction was stopped. The polymerization time was 280 minutes.

A weight of the obtained emulsion was 38.6 kg, a solid content of polymer was 27.2% by weight, and an average particle size of polymer particles was 166 nm. The number of polymer particles (per 1 cc of water) calculated by the above-mentioned equation was $5 \times 10^{13}$, and thus there was no change in the number of polymer particles as compared with that at the time when initiating the second polymerization step.

Also a polymer sticking on inner walls of the autoclave was collected and dried at 120° C. for 12 hours. A weight thereof was 8 g.

A 25% aqueous solution of $KAl(SO_4)_2$ was added to the emulsion for coagulation thereof, followed by washing with water and drying at 120° C. for 14 hours to collect an intended fluorine-containing polymer. As a result of NMR analysis, the fluorine-containing polymer was an elastomer comprising VdF/HFP of 76.4/23.6 (% by mole).

COMPARATIVE EXAMPLE 2

A 30-liter stainless steel autoclave was charged with 26 liter of pure water and 26 g of ammonium perfluorooctanoate (10% aqueous solution), and the inside of a system was replaced with nitrogen gas sufficiently. Then the inside pressure of the system was reduced and inhalation of 0.54 g of isopentane was carried out. After heating to 80° C. with stirring at 200 rpm, a monomer mixture comprising VdF/HFP (55/45% by mole) was introduced under pressure so that inside pressure of the autoclave became 1.47 MPa. Then 500 g of 1.34% aqueous solution of ammonium persulfate (APS) was introduced with pressurized nitrogen gas to initiate a reaction.

At the time when the inside pressure lowered to 1.37 MPa with advance of the polymerization, a monomer mixture of VdF/HFP (78/22% by mole) was introduced under pressure to restore the inside pressure of 1.47 MPa. After that, with advance of the reaction, the monomer mixture was introduced in the same way under pressure, and thus an increase and decrease in pressure were repeated between 1.37 MPa and 1.47 MPa. When the additional amount of the monomer mixture reached 300 g, 45.2 g of IPP was introduced with compressed nitrogen gas.

When the total amount of the monomers reached 10.0 kg, the autoclave was cooled, the monomers were exhausted and the reaction was stopped. The polymerization time was 260 minutes.

A weight of the obtained emulsion was 36.2 kg, a solid content of polymer was 27.8% by weight, and an average particle size of polymer particles was 425 nm. The number of polymer particles (per 1 cc of water) calculated by the above-mentioned equation was $5.3 \times 10^{12}$.

Also a polymer sticking on inner walls of the autoclave was collected and dried at 120° C. for 12 hours. A weight thereof was 33 g.

A 25% aqueous solution of $KAl(SO_4)_2$ was added to the emulsion for coagulation thereof, followed by washing with water and drying at 120° C. for 14 hours to collect an intended fluorine-containing polymer. The fluorine-containing polymer was an elastomer comprising VdF/HFP of 77.3/22.7 (% by mole).

EXAMPLE 3

First Stage Polymerization Step

A vertical type stainless steel autoclave which was equipped with an anchor stirring blade and two baffle plates and was capable of accommodating 3,000 g of water was charged with 1,767 g of pure water and ammonium perfluorooctanoate so that an amount thereof became 1.5% by weight based on water. Then after the inside of a system was replaced with nitrogen gas sufficiently and evacuated, hexafluoropropylene (HFP) and tetrafluoroethylene (TFE) in a gaseous form were introduced in adequate amounts. With stirring at 500 rpm, the inside temperature was maintained at 80° C. and the inside pressure was adjusted to 0.78 MPa. A sample of gas phase was analyzed with a gas chromatograph and as a result, components thereof was TFE/HFP= 51/49% by mole. Then 1.325 g (750 ppm based on water) of ammonium persulfate (APS) dissolved in a small amount of pure water was added as a polymerization initiator to initiate a polymerization. Since the pressure inside the autoclave lowered with advance of the reaction, a mixed gas of TFE/HFP (90.4/9.6% by mole) was added continuously and the inside pressure was maintained constant at 0.78 MPa. After 102-minute polymerization reaction, stirring and supplying of the TFE/HFP mixed gas were stopped and immediately un-reacted TFE/HFP monomer mixture was purged to be eliminated and the autoclave was cooled down to room temperature.

A solid content of the obtained FEP emulsion was 5.27% by weight, and an average particle size of polymer particles (measured by using a photograph taken with a transmission electron microphotograph, hereinafter the same) was 32 nm. The number of polymer particles (per 1 cc of water) calculated by the above-mentioned equation by using a specific weight of 2.0 was $1.6 \times 10^{15}$. A proportion of HFP of the obtained polymer (measured by NMR in melt state, hereinafter the same) was 16.4% by weight.

Dilution Step

A vertical type stainless steel autoclave which was equipped with a full-zone blade (available from Shinko Pantec Co., Ltd.) and two baffle plates and was capable of accommodating 3,000 g of water was charged with 93 g of emulsion obtained in the first polymerization step (amount of polymer: 4.9 g) and pure water so that the number of polymer particles became $8.4 \times 10^{13}$ (per 1 cc of water) and a total amount of pure water became 1,767 g. The dilution was 19 times. Ammonium perfluorooctanoate as an emulsifying agent came from the emulsion obtained in the first polymerization step, and a concentration thereof based on water was 0.075% by weight.

Second Stage Polymerization Step

After the inside of a system in the autoclave containing the above-mentioned diluted emulsion was sufficiently replaced with nitrogen gas and evacuated, a HFP solution was added in an adequate amount. With stirring at 500 rpm, the inside temperature was maintained at 90° C. and a mixed gas of TFE/HFP (90.2/9.8% by mole) was introduced with a compressor so that the inside pressure became 4.12 MPa. A sample of gas phase was analyzed with a gas chromatograph and as a result, components thereof was TFE/HFP= 16/84% by mole. Then 0.884 g (500 ppm based on water) of APS dissolved in a small amount of pure water was added as a polymerization initiator to initiate a second stage polymerization. Since the pressure inside the autoclave lowered with advance of the reaction, a mixed gas of TFE/HFP (90.2/9.8% by mole) was added continuously and the inside pressure was maintained constant at 4.12 MPa. After 110-minute polymerization: reaction, stirring and supplying of the TFE/HFP mixed gas were stopped and immediately un-reacted TFE/HFP monomer mixture was purged to be eliminated and the autoclave was cooled down to room temperature.

A solid content of the obtained FEP emulsion was 19.3% by weight, and an average particle size of polymer particles was 90 nm. A proportion of HFP of the obtained polymer was 17.2% by weight. Yield of the polymer was 423 g. A polymerization rate calculated by subtracting an amount of polymer in the emulsion obtained in the first polymerization step was 3.8 g/min.

COMPARATIVE EXAMPLE 3

Usual one-staged emulsion polymerization was carried out by using the same autoclave as used in the dilution step and second polymerization step of Example 3.

At first the autoclave was charged with 1,767 g of pure water and ammonium perfluorooctanoate so that an amount of ammonium perfluorooctanoate became 0.075% by weight based on water. Then after the inside of a system of the autoclave was replaced with nitrogen gas sufficiently and evacuated, a HFP solution was added in an adequate amount. With stirring at 500 rpm, the inside temperature was maintained at 90° C. and a mixed gas of TFE/HFP (90.2/9.8% by mole) was introduced with a compressor so that the inside pressure became 4.12 MPa. A sample of gas phase was analyzed with a gas chromatograph and as a result, components thereof was TFE/HFP=15/85% by mole. Then 0.884 g (500 ppm based on water) of APS dissolved in a small amount of pure water was added as a polymerization initiator to initiate a polymerization. Since the pressure inside the autoclave lowered with advance of the reaction, a mixed gas of TFE/HFP (90.2/9.8% by mole) was added continuously and the inside pressure was maintained constant at 4.12 MPa. After 330-minute reaction, stirring and supplying of the TFE/HFP mixed gas were stopped and immediately un-reacted TFE/HFP monomer mixture was purged to be eliminated and the autoclave was cooled down to room temperature.

A solid content of the obtained FEP emulsion was 12.3% by weight, and an average particle size of polymer particles was 159 nm. The number of polymer particles (per 1 cc of water) calculated from those values was only $3.3 \times 10^{13}$. A proportion of HFP of the obtained polymer was 18.5% by weight. Yield of the polymer was 248 g. A polymerization rate was 0.75 g/min. It can be seen that the polymerization speed is as low as about 1/5 as compared with Example 3.

In other words, when the two-staged polymerization method of the present invention is employed, a polymerization rate can be increased even if a concentration of emulsifying agent is the same. On the contrary, when the polymerization rate is not changed, the concentration of emulsifying agent can be reduced. Since the emulsifying agent is in general expensive, the present invention is industrially very advantageous because high productivity can be obtained with a reduced amount of emulsifying agent.

EXAMPLE 4

In Example explained below, since a continuous polymerization is employed, the first and second polymerization steps are carried out continuously.

First Stage Polymerization Step, Dilution Step

Ammonium perfluorooctanoate, ammonium persulfate (APS) and a mixture of diethyl malonate and deoxidized ion-exchanged water (9.0% by weight of ammonium perfluorooctanoate based on water, 500 ppm by weight of APS based on water, 270 ppm by weight of diethyl malonate based on water) and a mixture of VdF/HFP (25/75% by mole) were introduced continuously into a stainless steel tube having an outer diameter of 0.25 inch, a wall thickness of 0.8 mm and a length of 8 m at a flow rate of 0.55 g/min and 1.0 g/min, respectively. The tube was heated to 90° C. and an inside pressure thereof was maintained at 6.2 MPa with a back pressure regulating valve. While maintaining a pressure of an outlet effluent, the outlet effluent was fed to a 450-ml stainless steel autoclave equipped with a stirrer. To the autoclave was introduced deoxidized ion-exchanged water additionally at a flow rate of 23.0 g/min to dilute the effluent. A temperature of the autoclave was adjusted to 100° C., and a pressure thereof was maintained at 6.2 MPa with a back pressure regulating valve in the same way and the number of rotations of the stirrer was maintained at 620 rpm.

As a result, the dilution was 47 times based on water.

Second Stage Polymerization Step

A 1,740-ml stainless steel autoclave equipped with a stirrer was charged with a total amount of a mixture of rubber particles flowed out from the previous step and also a mixture of VdF/HFP (83/17% by mole) and a mixture: of diisopropyl peroxydicarbonate (IPP), 2,2,3,3-tetrafluoropropyl alcohol (FA), ammonium perfluorooctanoate, diethyl malonate (DEM) and deoxidized ion-exchanged water (0. 14% by weight of IPP based on water, 0.22% by weight of FA based on water, 2.06% by weight of ammonium perfluorooctanoate, 0.82% by weight of DEM) continuously at a flow rate of 4.0 g/min and 3.2 g/min, respectively. A temperature and pressure of the autoclave were maintained at 90.0° C. and 6.2 MPa, respectively, and the number of rotations of the stirrer was maintained at 620 rpm. A latex flowing out continuously was sampled and analyzed.

In a sufficiently stable state of the system after starting of the reaction, the number of particles of the diluted latex flowing out from the first polymerization step and dilution step was $3.3 \times 10^{14}$ (per 1 cc of water). In the second stage polymerization step, the number of particles was $2.0 \times 10^{14}$, an average particle size was 97 nm, and a solid content of the polymer was 14.3% by weight.

An aqueous solution of 25% by weight of $KAl(SO_4)_2$ was added to the latex from the second stage polymerization step for coagulation, followed by washing with water and then drying at 120° C. for 12 hours to give an intended fluorine-containing polymer. As a result of NMR analysis, the fluorine-containing polymer was an elastomer comprising VdF/HFP of 77/23% by mole.

COMPARATIVE EXAMPLE 4

A second stage polymerization step was carried out in the same manner as in Example 4, and in a first polymerization step and dilution step, an amount of deoxidized ion-exchanged water was increased so that a concentration of emulsifying agent in a tube would be the same as that after the dilution of Example 1, and then the first polymerization step was terminated without carrying out dilution. In that case, after the second polymerization step, the number of particles (per 1 cc of water) was $8.6 \times 10^{12}$ and a particle size was 270 nm.

Mechanical stability of the obtained latex was inferior as compared with that of Example 1.

INDUSTRIAL APPLICABILITY

According to the preparation process of the present invention, a stable emulsion can be obtained with a small amount of emulsifying agent without changing polymerization conditions greatly and polymer particles can be made :uniform and high in concentration. Even in a polymerization system where there is a limit in an amount of polymerization initiator, a polymerization rate can be made high, a polymerization time can be shortened to a half or shorter, and a final yield of the polymer can be increased. Further since an amount of polymer sticking on inner walls of a polymerization reactor can be reduced, productivity can be greatly increased while maintaining various properties of the fluorine-containing polymer.

What is claimed is:

1. A process for preparing a fluorine-containing polymer comprising:

(a) a first polymerization step for emulsion-polymerizing a fluorine-containing monomer or a mixture of a fluorine-containing monomer and a non-fluorine-containing monomer in an aqueous medium in the presence of a radical polymerization initiator and an emulsifying agent; a concentration of the emulsifying agent being not less than 0.5% by weight based on the aqueous medium, (b) a dilution step for diluting the obtained aqueous emulsion of polymer particles with water to reduce the number of emulsified polymer particles per unit amount of aqueous medium in the emulsion and a concentration of emulsifying agent, and (c) a second polymerization step for emulsion-polymerizing a fluorine-containing monomer and/or a non-fluorine-containing monomer in the obtained diluted emulsifion.

2. The preparation process of claim 1, wherein in the first polymerization step (a), a water soluble radical polymerization initiator is used and in the second polymerization step (c), an oil soluble radical polymerization initiator is used.

3. The preparation process of claim 1, wherein in the first polymerization step and/or in the second polymerization step (c), the emulsion polymerization is carried out in the presence of a compound represented by the formula (I):

$$R(I)x(Br)y \qquad (I)$$

wherein R is a saturated or unsaturated divalent fluoro hydrocarbon group or divalent chlorofluoro hydrocarbon group having 1 to 16 carbon atoms or a saturated or unsaturated divalent hydrocarbon group having 1 to 3 carbon atoms, x and y are 0, 1 or 2, x+y=2.

4. The preparation process of claim 1, wherein the first polymerization step (a) is carried out so that the number of particles of emulsified polymer in the obtained emulsion becomes $1 \times 10^{14}$ or more per 1 cc of the aqueous medium, and in the following dilution step (b), dilution is carried out with water so that the number of particles of polymer in the emulsion is within a range of $3 \times 10^{13}$ to $1 \times 10^{15}$ per 1 cc of the aqueous medium.

5. The preparation process of claim 1, wherein an amount of polymer in the diluted emulsion obtained in the dilution step (b) is 0.5 to 10% of a final amount of the polymer obtained in the second polymerization step (c).

6. The preparation process of claim 1, wherein an amount of monomers used in the second polymerization step (c) is adjusted so that an average particle size of polymer particles obtained in the second polymerization step (c) is not more than 500 nm.

7. The preparation process of claim 1, wherein in the dilution step (b) and/or the second polymerization step (c), emulsifying agent is added so that an amount thereof can be maintained within a range of 0.3 to 30 mg per 1 g of polymer particles.

8. The preparation process of claim 1, wherein in the second polymerization step, the emulsion polymerization is carried out continuously while introducing the diluted emulsion and fluorine-containing monomer and/or non-fluorine-containing monomer continuously.

9. The preparation process of claim 1, wherein the obtained fluorine-containing polymer is a fluorine-containing elastomer.

10. The preparation process of claim 9, wherein the fluorine-containing elastomer comprises vinylidene fluoride and hexafluoropropylene.

11. The preparation process of claim 1, wherein the obtained fluorine-containing polymer is a fluorine-containing resin.

12. The preparation process of claim 11, wherein the fluorine-containing resin comprises tetrafluoroethylene and hexafluoropropylene.

13. The preparation process of claim 2, wherein the first polymerization step (a) is carried out so that the number of particles of emulsified polymer in the obtained emulsion becomes $1 \times 10^{14}$ or more per 1 cc of the aqueous medium, and in the following dilution step (b), dilution is carried out with water so that the number of particles of polymer in the emulsion is in a range of $3 \times 10^{13}$ to $1 \times 10^{15}$ per 1 cc of the aqueous medium.

14. The preparation process of claim 3, wherein the first polymerization step (a) is carried out so that the number of particles of emulsified polymer in the obtained emulsion becomes $1 \times 10^{14}$ or more per 1 cc of the aqueous medium, and in the following dilution step (b), dilution is carried out with water so that the number of particles of polymer in the emulsion is in a rage of $3 \times 10^{13}$ to $1 \times 10^{15}$ per 1 cc of the aqueous medium.

15. The preparation process of claim 2, wherein in the dilution step (b) and/or the second polymerization step (c), emulsifying agent is added so that an amount thereof can be maintained within a range of 0.3 to 30 mg per 1 g of polymer particles.

16. The preparation process of claim 3, wherein in the dilution step (b) and/or the second polymerization step (c), emulsifying agent is added so that an amount thereof can be maintained within a range of 0.3 to 30 mg per 1 g of polymer particles.

\* \* \* \* \*